3,403,104
BORATE CORROSION INHIBITORS
Patrick B. Sullivan, Peekskill, N.Y., assignor to Union Carbide Corporation, a corporation of New York
No Drawing. Filed July 21, 1966, Ser. No. 566,756
4 Claims. (Cl. 252—74)

ABSTRACT OF THE DISCLOSURE

The reaction product of an alkaline borate such as a sodium borate and hexanetriol is used as a corrosion inhibitor in hydraulic fluids.

---

The invention relates to improved borate corrosion inhibitors and to their use in hydraulic fluids. In a particular aspect, the invention relates to improved corrosion inhibitors comprising the reaction product of alkaline borate and hexanetriol, and to the use of said improved inhibitors in hydraulic fluids.

Borate-glycol reaction products are commercially employed as corrosion inhibitors in hydraulic fluids. The inhibitors are added to the hydraulic fluid as solutions of the glycol-borate reaction product in excess glycol. The excess glycol is needed because the said reaction products may be solids or very viscous liquids at room temperature. However, in a high boiling hydraulic fluid the excess glycol will often be the lowest boiling component. In such cases, the glycol limits the maximum permissible use temperature of the fluid.

The present invention is based upon the discovery that hexanetriol-borate reaction products are highly effective corrosion inhibitors for hydraulic fluids. Hexanetriol is considerably higher boiling than the glycols heretofore used in the preparation of borate corrosion inhibitors. Therefore, the use of hexanetriol-borate reaction products does not lower the boiling point of high boiling fluids. Even more surprising is the fact that the use of hexanetriol in preparing the borate corrosion inhibitors offers unexpected advantages over the use of glycerol. When a glycerol-borate reaction product is employed as a corrosion inhibitor in a hydraulic fluid, the residue after evaporation is either a hard resin or a gummy material. In contrast, when the hexanetriol-borate reaction products are employed as corrosion inhibitors in hydraulic fluids, the evaporation residues are generally soft and smooth. What this means in actual practice is that the hexanetriol-borate corrosion inhibitors are much less likely to cause fouling and clogging of hydraulic lines than would the glycerol-borate inhibitors.

The hexanetriol-borate reaction products are produced by heating a mixture of hexanetriol (preferably 1,2,6-hexanetriol) and alkaline borate under such conditions that water is removed from the mixture. The alkaline borates that are used are the alkali metal or the alkaline earth metal borates such as sodium metaborates including the anhydrous and the tetrahydrate forms, sodium tetraborate including the anhydrous, pentahydrate, and decahydrate forms, calcium metaborate including the dihydrate and hexahydrate forms, calcium tetraborate decahydrate, magnesium metaborate octahydrate, anhydrous lithium metaborate, lithium tetraborate pentahydrate, strontium tetraborate tetrahydrate, anhydrous potassium metaborate, potassium tetraborate pentahydrate, and the like. The sodium tetraborates are preferred, especially sodium tetraborate pentahydrate.

The hexanetriol and borate mixture is heated under such conditions that water is removed from the mixture. The water that is removed is both the water of hydration that might be present in the borate and water of condensation from the reaction of hexanetriol with borate. The reaction can be carried out by adding the borate to hexanetriol and then heating to a temperature in excess of 100° C. Preferably, the temperature is gradually increased to about 200° C. or more, and at the same time, the pressure of the reaction system is gradually decreased to, for instance, 50 millimeters of mercury or less. If complete dehydration is desired, the reaction is continued until the water stops coming off. This will normally take from about 1 to about 5 hours or longer, depending, in part, upon the batch size, temperature and vacuum. If only partial dehydration is desired, the reaction is correspondingly shorter. The completely dehydrated products are preferred.

The proportions of the reactants are determined by a number of factors. For example, with completely dehydrated products the use of more than about 1 mole of borate per 10 moles of hexanetriol results in a very viscous solution. If less than about 1 mole of borate per 35 moles of hexanetriol is employed, the viscosity characteristics of the hydraulic fluid may be adversely affected. Borate-hexanetriol molar ratios of from about 1:15 to about 1:30 are preferred, with molar ratios of from about 1:20 to about 1:25 being more preferred. The foregoing ratios apply to the fully dehydrated products. With partially dehydrated products, correspondingly more borate can be used. For instance, if about two-thirds of the available water is removed, the borate: hexanetriol molar ratio can be as low as about 1:8.

The borate-hexanetriol reaction product is employed as a corrosion inhibitor in hydraulic fluids. As is well known in the art, a hydraulic fluid can contain several components such as lubricants, diluents, and stabilizers. For instance, typical lubricants include polyoxyethylene-polyoxypropylene copolymers having molecular weights of from about 250 to about 10,000, and preferably from about 300 to about 5000. These copolymers usually have oxypropylene:oxyethylene weight ratios of from about 75:25 and higher to about 50:50 with the high molecular weight lubricants which are normally employed with a diluent. The lower molecular weight lubricant which can be employed without a diluent will often have as much as 75 weight percent or more of oxyethylene groups, the remainder being oxypropylene and/or oxybutylene. The copolymers are prepared by reacting a mixture of ethylene oxide and 1,2-propylene oxide with a starter such as ethylene glycol, propylene glycol, diethylene glycol, diproylene glycol, methanol, ethanol, propanol, butanol, and the like. A mixture of two or more of such lubricants can be used. The nature and production of such copolymers is well known in the art, as is illustrated by U.S. Patent Nos. 2,425,755 (Roberts et al.), 2,425,845 (Toussaint et al.), and 3,062,747 (Fife et al.).

Polyoxypropylene homopolymers are also useful as lubricants. For instance, 1,2-propylene oxide adducts of methanol, ethanol, propanol, butanol, water, ethylene glycol, propylene glycol, and the like are useful. The molecular weight of the polyoxypropylene homopolymers can vary from about 250 to about 10,000.

Another useful type of hydraulic fluids comprises those based upon castor oil or castor oil modified by the addition of alkylene oxides such as ethylene oxide and propylene oxide.

It is customary in the art to indicate the molecular weight of the lubricant by referring to its viscosity in Saybolt Universal seconds (SUS) at 100° F. Lubricants having viscosities of from about 40 SUS to about 6000 SUS at 100° F. are normally employed in hydraulic fluids.

Typical diluents that are employed in hydraulic fluids include the monomethyl ether of ethylene glycol, the monomethyl ether of diethylene glycol, the monoethyl ether of diethylene glycol, the monobutyl ether of diethylene glycol, the monomethyl ether of triethylene glycol, the monoethyl ether of triethylene glycol, ethylene glycol, propylene glycol, and the like.

Useful additives including stabilizers and oxidation inhibiters that are customarily employed in hydraulic fluids include phenyl-alpha-naphthylamine, sodium nitrate, N-phenylmorpholine, 2,2-bis(para-hydroxyphenyl)propane, tricresyl phosphate, and the like.

The proportions of the components are well known in the art. For instance, typical hydraulic fluids usually contain from about 20 to 100 weight percent lubricant, from about 0 to 80 weight percent diluent, and from about ½ to 2 weight percent stabilizer and other additives.

The hexanetriol-borate reaction product is employed in an amount that is effective in inhibiting corrosion. For instance, it is desirable to employ the reaction product in an amount sufficient to provide from about 0.2 to about 1.5 weight percent borate, based upon weight of the hydraulic fluid.

The hydraulic fluids of the invention are highly useful as brake fluids and as many other types of hydraulic fluids. The hexanetriol-borate inhibitors enable the production of hydraulic fluids that can be used at higher temperatures than such fluids having glycol-borate inhibitors. Of course, the utility of the fluids of the invention is not limited to high temperature uses. The fluids provided by the invention are also highly useful for hydraulic systems having less severe requirements.

The invention is illustrated by the examples which follow:

EXAMPLE 1

211.5 grams of 1,2,6-hexanetriol was placed in 500 ml. flask and heated to 100° C. 20 grams of sodium tetraborate pentahydrate was added to the hot 1,2,6-hexanetriol and heated until the sodium tetraborate pentahydrate was dissolved. (The mole ratio of sodium tetraborate pentahydrate to 1,2,6-hexanetriol was approximately 1:23.) The pressure of the system was then slowly lowered to 50 mm. pressure and the pot temperature was gradually increased to 220° C. and until all the water of hydration and reaction was removed (average of 12 mols). The resulting product, which was a yellow viscous liquid, contained the equivalent of one gram of sodium tetraborate pentahydrate in 10.7 grams of the concentrate.

EXAMPLE 2

212.5 grams of 1,2,6-hexanetriol was placed in 500 ml. flask and heated to 100° C. 40.4 grams of sodium tetraborate pentahydrate were added and the mixture was heated and stirred until the sodium tetraborate pentahydrate was dissolved. (The mol ratio of the sodium tetraborate pentahydrate to the 1,2,6-hexanetriol was 1:11.1.) The pressure of the system was then slowly lowered to 50 mm. and the pot temperature was gradually increased to 220° C. and until all the water of hydration and reaction was removed. The concentrate was very viscous and practically a glass at room temperature. The equivalent of one gram of sodium tetraborate pentahydrate was contained in 5.7 grams of the concentrate.

EXAMPLE 3

(Concentrate prepared with partial dehydration)

Sodium tetraborate pentahydrate and 1,2,6-hexanetriol were mixed in the molar ratios of 1:23 and heated and stirred in an open beaker until 8 moles of water was removed. The final temperature was 125° C. The resultant soultion was a yellow viscous liquid. The equivalent of one gram of sodium tetraborate was contained in 11.0 grams of concentrate.

EXAMPLE 4

(Concentrate prepared with partial dehydration)

Same as Example 3 except only 5 moles of water were removed. The resultant soultion was a yellow viscous liquid. The equivalent of 1 gram of sodium tetraborate pentahydrate is present in 11.2 grams of concentrate.

EXAMPLE 5

(A more concentrated concentrate prepared with partial dehydration)

Sodium tetraborate pentahydrate and 1,2,6-hexanetriol were mixed in the molar ratios of 1:11.4 and were heated and stirred in an open beaker until 5 moles of water removed. The final pot temperature was 130° C. The resultant product was a yellow viscous liquid at room temperature. (Note.—In Example 2 when 12 moles of water were removed, the product was a glass solid.) The equivalent of 1 gram of sodium tetraborate pentahydrate is present in 5.96 grams of product.

EXAMPLE 6

(A highly concentrated concentrate prepared with partial dehydration)

Sodium tetraborate pentahydrate and 1,2,6-hexanetriol were mixed in the molar ratios of 1:7.6 and were heated and stirred in an open beaker until 5 moles of water were removed. The resultant product was a yellow, very viscous material which was practically a solid at room temperature. The equivalent of one gram of sodium tetraborate pentahydrate is present in 4.26 grams of the product. This product was considered too viscous to be useful.

The quality of evaporation residues of brake fluids prepared with the partially dehydrated concentrates have a smoother texture than the residues of fluids containing a comparable concentrate from which all the water has been removed. However, the residual water in the partially dehydrated product tends to reduce the boiling point of high boiling fluids and therefore the fully dehydrated concentrates are preferably used where very high boiling brake fluids are required.

EXAMPLE 7

Sodium tetraborate pentahydrate, 1,2,6-hexanetriol and propylene glycol were mixed in the molar ratios of 1:5.7:9.6. The mixture was heated and stirred and pressure was gradually reduced to 50 mm. Temperature was allowed to rise to 130° C. and until 12 moles of water was removed. The product was a yellow viscous liquid. The equivalent of one gram of sodium tetraborate pentahydrate is present in 5.21 grams of product.

The use of other triols besides 1,2,6-hexanetriol, such as glycerol, have also been studied. Thus, completely dehydrated sodium tetraborate pentahydrate-glycerol reaction products with molar ratios similar to those described for sodium tetraborate have been prepared. The preparation of these concentrates is given in Examples 8 and 9.

EXAMPLE 8

(Concentrate prepared with glycerol)

Sodium tetraborate pentahydrate and glycerol were mixed in the molar ratios of 1:23 and heated. The pressure of the system was gradually reduced to 50 mm. and temperature was raised to 215° C. until 11 moles of water were removed. The resulting product was a clear viscous liquid. The equivalent of one gram of sodium tetraborate pentahydrate is present in 7.55 grams of the product.

EXAMPLE 9

(Higher concentrate prepared from glycerol)

Sodium tetraborate pentahydrate and glycerol were mixed in the molar ratios of 1:12 and heated. The pressure of the system was gradually reduced to 50 mm. and temperature was gradually raised to 250° C. 12 moles of water were removed. The resulting product was a clear, very viscous fluid practically solid at room temperature.

The equivalent of one gram of sodium tetraborate pentahydrate is present in 4.1 grams of product.

The preferred method of preparing the hexanetriol/borate concentrate may be modified because it is not necessary to start with the pentahydrate salt of sodium tetraborate, thus borate salts with other degrees of hydration can be used to prepare the product. It is even possible as in Example 10 to add water initially to the system to facilitate the dissolution of the sodium tetraborate in the 1,2,6-hexanetriol.

EXAMPLE 10

Sodium tetraborate pentahydrate, 1,2,6-hexanetriol and water were mixed in the molar ratios of 1:23.2:31 and heated until the sodium tetraborate pentahydrate dissolved. The pressure of the system was then reduced to 50 mm. and the temperature was gradually raised to 200° C. 42 moles of water were removed. This represents the 31 moles of water which were added and 11 moles which represent the water of hydration and reaction. The resulting product was a yellow viscous liquid. The equivalent of one gram of sodium tetraborate pentahydrate is present in 10.9 grams.

EXAMPLE 11

The concentrates prepared in Examples 1–3, 5 and 7–10 were added to the hydraulic fluids which were then subjected to evaporation tests, after which the fluids were exposed to a humid atmosphere. The evaporation tests were carried out by heating the fluids at 212° F. for 2 or more days in open containers. In the humidity test, the residues were exposed to an atmosphere of 50% relative humidity at 73° F. for 4 days.

The fluids employed contained as the lubricant the reaction product of butanol and propylene oxide having a viscosity of 285 SUS at 100° F. The diluent was a mixture of the following components:

| | Parts by weight |
|---|---|
| Monomethyl ether of triethylene glycol | 60 |
| Monobutyl ether of diethylene glycol | 27 |
| Monoethyl ether of triethylene glycol | 13 |

Also, each fluid contained 0.1 weight percent of Agerite Resin D as an antioxidant. (Agerite Resin D is polymerized trimethyl dihydroquinoline.)

The table below displays the compositions of the fluids and the results of the evaporation tests in which the qualities of the evaporation residues were determined:

TABLE I.—EVAPORATION TESTS

| Example | Fluid Composition, Wt. percent | | | Mol Ratio, Borate:Polyol | Quality of Evaporation Residue | |
|---|---|---|---|---|---|---|
| | Borate Concentrate | Lubricant | Diluent | | Before Humidity Test | After Humidity Test |
| 1 | 5.35 | 20 | 74.55 | 1:23 (hexanetriol) | Smooth | Smooth. |
| 2 | 2.35 | 20 | 77.5 | 1:12 (hexanetriol) | Hard gum, trace of grit | Do. |
| 3 | 5.5 | 20 | 74.4 | 1:23 (hexanetriol) | Smooth | Do. |
| 5 | 2.98 | 20 | 76.92 | 1:11.4 (hexanetriol) | Gummy | Do. |
| 7 | 2.7 | 20 | 77.2 | 1:(5.7 hexanetriol+9.6 propylene glycol) | Hard gum, trace of grit | Trace of abrasive. |
| 8 | 3.77 | 20 | 76.13 | 1:34 (glycerol) | Hard resin | Gummy. |
| 9 | 2.05 | 20 | 77.85 | 1:12 (glycerol) | Hard resin, slight grit | Do. |
| 10 | 5.45 | 20 | 74.45 | 1:23 (hexanetriol) | Smooth | Smooth. |

EXAMPLES 12–17

One of the requirements for a brake fluid is that the evaporation residue have a minimum viscosity of 10 centistokes at 210° F. When the prior art ethylene glycol-borate inhibitors are employed, the residue is usually cloudy and usually contains a precipitate (sometimes to the extent that flow is impossible), while the evaporation residues of the present invention are normally clear and flow readily. To illustrate this, several brake fluids were formulated using hexanetriol-borate inhibitors and ethylene glycol-borate inhibitors. The fluids were evaporated by heating in open containers at 210° F. for two days, after which the viscosities of the residues were determined. Table II, below, displays the compositions of the fluids and Table III displays the results of the evalution of the residues. The borate employed was sodium tetraborate pentahydrate, and the polyol/borate condensation products were fully dehydrated.

TABLE II.—FLUID COMPOSITIONS

| Component | Example Number (parts by weight) | | | | | |
|---|---|---|---|---|---|---|
| | 12 | 13 | 14 | 15 | 16 | 17 |
| Lubricant A [1] | 20 | | | | 20 | 20 |
| Lubricant B [2] | | 20 | 20 | 20 | | |
| Monoethyl ether of ethylene glycol | 25 | 25 | 30 | | | |
| Monoethyl ether of diethylene glycol | 50 | 50 | 46 | | | |
| Monomethyl ether of triethylene glycol | | | | 5 | 5 | |
| Monoethyl ether of triethylene glycol | | | | 72 | 72 | 50 |
| 2-ethylbutanol-1 | | | | | | 25 |
| 1,2,6-hexanetriol | 4 | 4 | | | | |
| Ethylene glycol | | | 3 | 4.1 | 4.1 | 4.0 |
| Borate | 0.4 | 0.4 | 0.5 | 0.4 | 0.4 | 0.5 |
| Inhibitors (Agerite Resin D) | 0.6 | 0.6 | 0.5 | 0.5 | 0.5 | 0.5 |

[1] Reaction product of a 50/50 mixture (by weight) of ethylene oxide and propylene oxide with butanol having a viscosity at 100° F. of 660 SUS.
[2] Same as Lubricant A except that the 100° F. viscosity is 260 SUS.

TABLE III.—EVALUATION OF EVAPORATION RESIDUES

| Example | Weight Percent Residue | Viscosity of Residue at 210° F. (csts.) | Remarks |
|---|---|---|---|
| 12 | 25.0 | 22.3 | Clear, flowed readily. |
| 13 | 22.5 | 13.1 | Do. |
| 14 | 20.4 | | No flow, precipitate blocked viscometer. |
| 15 | 21.4 | 30.2 | Cloudy, precipitate. |
| 16 | 20.4 | 10.7 | Do. |
| 17 | 23.0 | 10.7 | Cloudy, viscous gel. |

What is claimed is:

1. A hydraulic fluid containing as a corrosion inhibitor the reaction product of an alkaline borate and 1,2,6-hexanetriol, said reaction product being produced by dehydrating a mixture of alkaline borate and 1,2,6-hexanetriol in proportions of from about 8 to about 35 moles of 1,2,6-hexanetriol per mole of borate at a temperature in excess of about 100° C. for a period of from about 1 to about 5 hours.

2. The hydraulic fluid of claim 1 wherein said hydraulic fluid contains a polyoxyalkylene polymer having a molecular weight of from about 250 to about 10,000 as a lubricant.

3. The hydraulic fluid of claim 1 wherein said alkaline borate is a sodium borate.

4. The hydraulic fluid of claim 3 wherein said sodium borate is sodium tetraborate pentahydrate.

References Cited

UNITED STATES PATENTS

| 2,979,524 | 4/1961 | Wright et al. | 252—75 X |
| 2,982,733 | 5/1961 | Wright et al. | 252—75 X |
| 3,262,961 | 7/1966 | Jordan | 252—75 X |
| 3,325,423 | 6/1967 | Jordan | 252—389 |

LEON D. ROSDOL, *Primary Examiner.*

STANLEY D. SCHWARTZ, *Assistant Examiner.*